April 20, 1943.  J. O. HAMREN  2,316,788
FLUID MOTOR
Filed Feb. 12, 1941  3 Sheets-Sheet 2

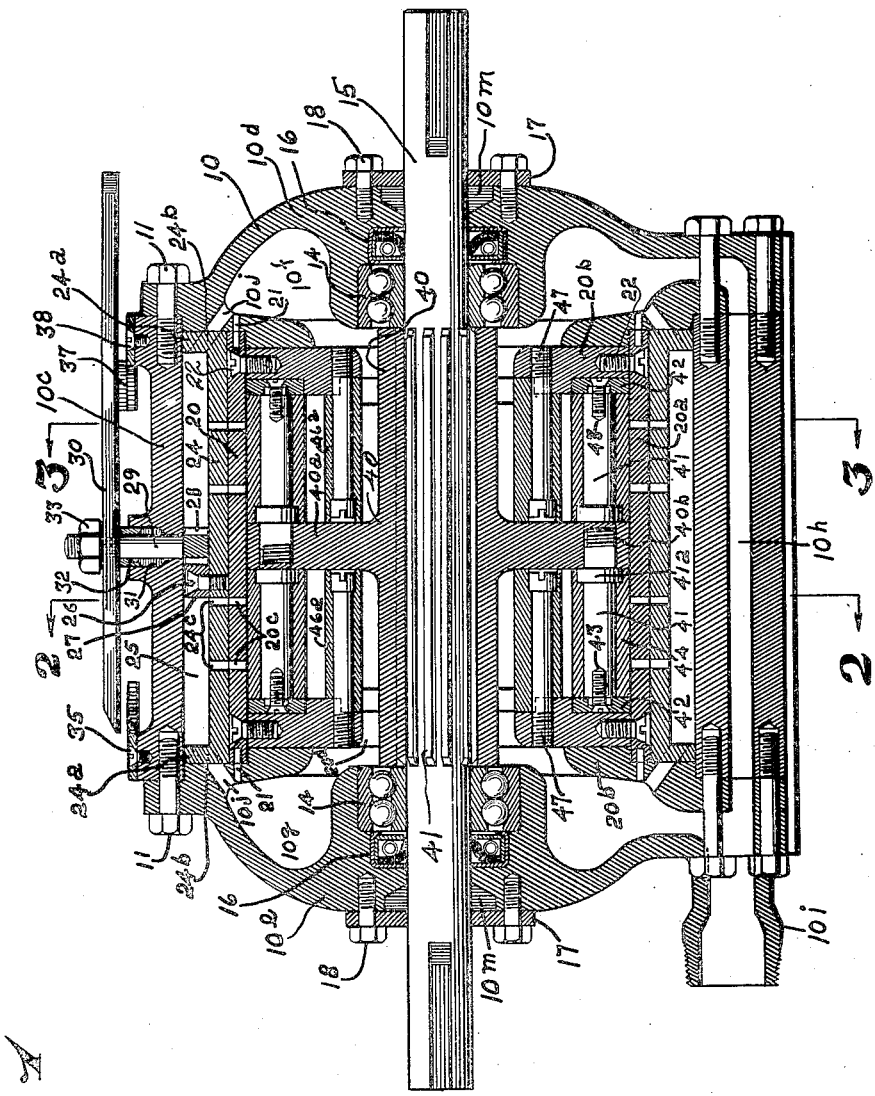

INVENTOR
JOSEPH O. HAMREN
BY
ATTORNEY

Patented Apr. 20, 1943

2,316,788

UNITED STATES PATENT OFFICE 2,316,788

FLUID MOTOR

Joseph O. Hamren, Minneapolis, Minn.

Application February 12, 1941, Serial No. 378,518

14 Claims. (Cl. 121—93)

This invention relates to a fluid motor. The motor disclosed herein is an improvement upon that disclosed and claimed in applicant's Patent No. 1,966,892, granted July 17, 1934.

It is an object of this invention to provide a motor having a rotor with two or more series of oscillating propelling vanes thereon, said series of vanes and other parts being arranged to produce a balanced motor.

It is another object of the invention to provide a motor having a shaft, a rotor secured to said shaft and carrying a series of oscillating vanes and means including a series of circumferentially spaced nozzle-forming passages preferably arranged tangentially for delivering fluid under pressure against said vanes.

It is also an object of the invention to provide a motor having an outer casing, an inner casing, a shaft journaled in the ends of said outer casing, a rotor secured to said shaft having a central portion and having propelling vanes carried at each side of said central portion in symmetrical relation to thus provide two series of vanes, a cam for each of said vanes, means for delivering a fluid under pressure to said vanes for propelling said rotor and outlet passages leading through said cams and inner casing to the end portions of said outer casing.

It is also an object of the invention to provide a motor comprising an outer casing having end portions, a shaft journaled in said end portions, an inner casing disposed between said end portions, a rotor secured to said shaft and adapted to rotate within said inner casing, said rotor having a central portion and a series of blades at each side of said central portion, said outer casing, inner casing, rotor and cams being symmetrical about a central vertical axis of said rotor.

It is still another object of the invention to provide a motor comprising an outer casing, an inner casing having a cylindrical wall, a sleeve fitting on and rotatable on said inner casing, a rotor within said inner casing having a series of propelling vanes, said inner casing and sleeve having extending therethrough a series of passages adapted to be brought into and out of register and which when in register form nozzles for directing fluid under pressure against said vanes, said passages being arranged tangentially to the circumference of said inner casing and sleeve.

These and other objects and advantages of the invention will be fully set forth in the following description made in connection with the accompanying drawings in which like reference characters refer to similar parts throughout the several views and in which:

Fig. 1 is a central longitudinal vertical section of the device;

Figure 4:
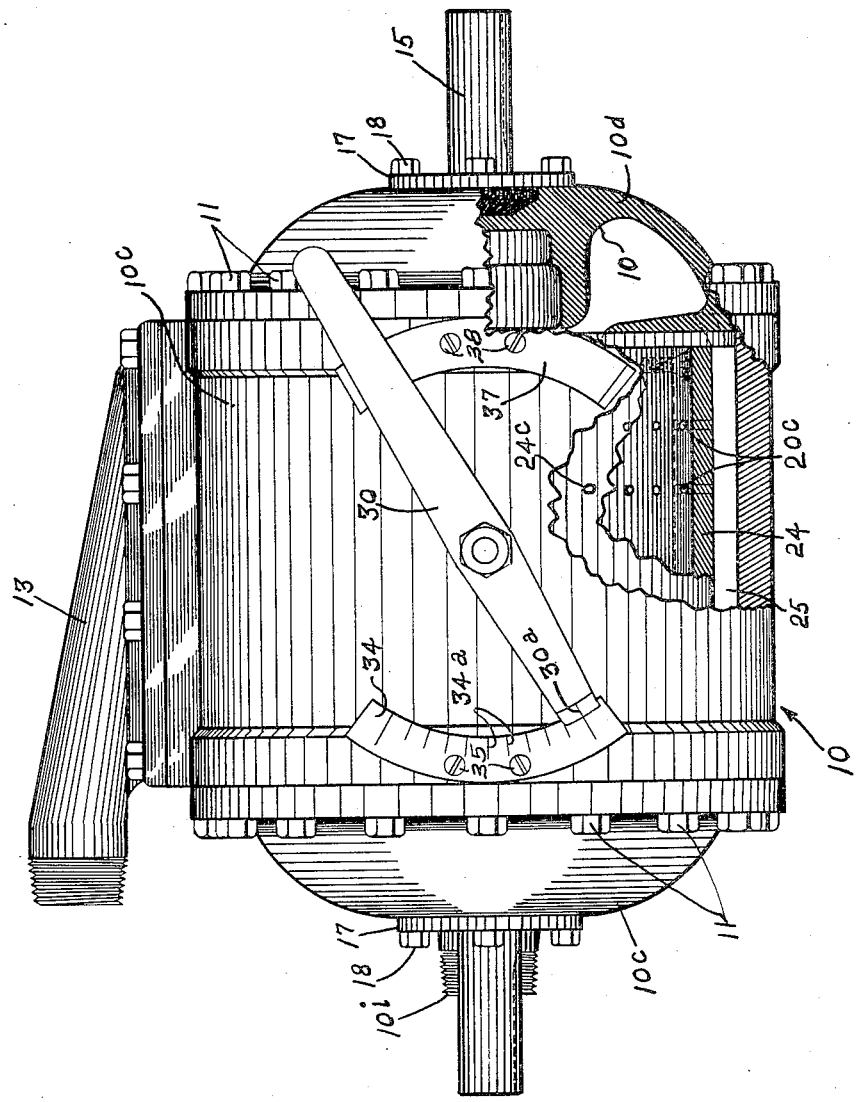
Fig. 4 is a top plan view, some parts being broken away and others shown in horizontal section.

Referring to the drawings, a motor is shown comprising an outer casing 10. While this casing might take various forms, in the embodiment of the invention illustrated it is shown as having a base portion 10a provided with holes 10b adapted to receive attaching or foundation bolts. Casing 10 has a central substantially cylindrical portion 10c to which are connected by circumferentially spaced bolts 11 end portions 10d and 10e. End portions 10d and 10e have therein annular chambers 10f and 10g respectively. Base portion 10a of the outer casing has a passage 10h extending longitudinally thereof which communicates with and connects the chambers 10f and 10g at the bottom portions of the latter. End portion 10e also has a discharge conduit 10i at its bottom portion, the same being shown as having a threaded peripheral end. End portions 10d and 10e are also provided with a series of circumferentially spaced inclined and inwardly directed passages 10j for a purpose to be later described. The central portion 10c of the outer casing has a flat surfaced boss at one side to which is connected by the bolts 12 an inlet member or conduit 13. This is best shown in Fig. 4 where it will be seen that the end of the conduit is directed longitudinally and provided with a threaded periphery. The passage in member 13 communicates with a passage 10k in portion 10c which leads to the interior of the latter. End portions 10d and 10e have central hubs in the inner portions of which are disposed ball bearings 14. A shaft 15 extends through the casing in said end portions and is journaled in bearings 14. Sealing members 16 are disposed about shaft 15 at the outer sides of bearings 14. End portions 10d and 10e have recesses 10m which are adapted to receive packing which will be held in place by end plates 17 secured to said end portions by circumferentially spaced bolts 18.

Figure 3:
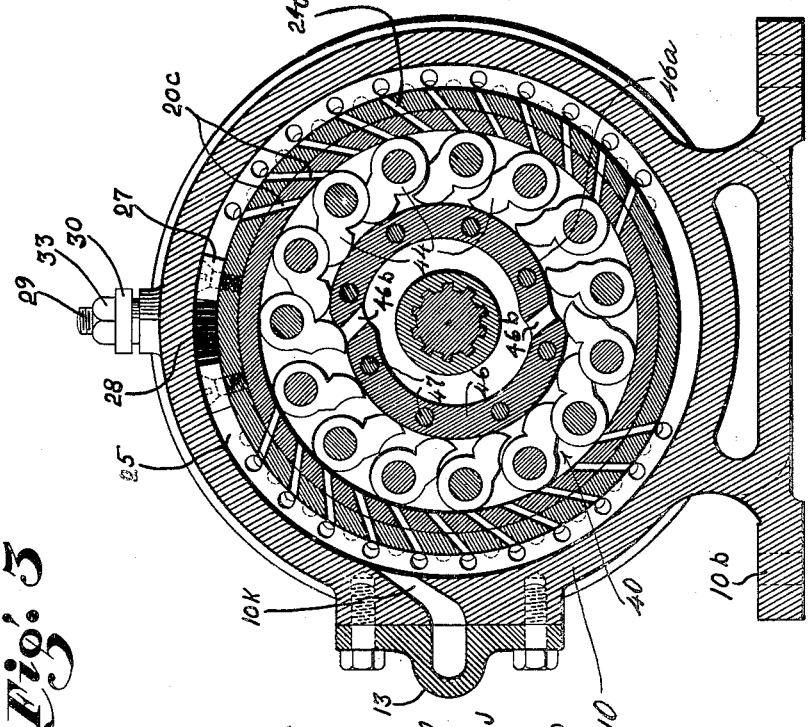
Fig. 3 is a vertical section taken substantially on line 3—3 of Fig. 1 as indicated by the arrows.
Figure 2:
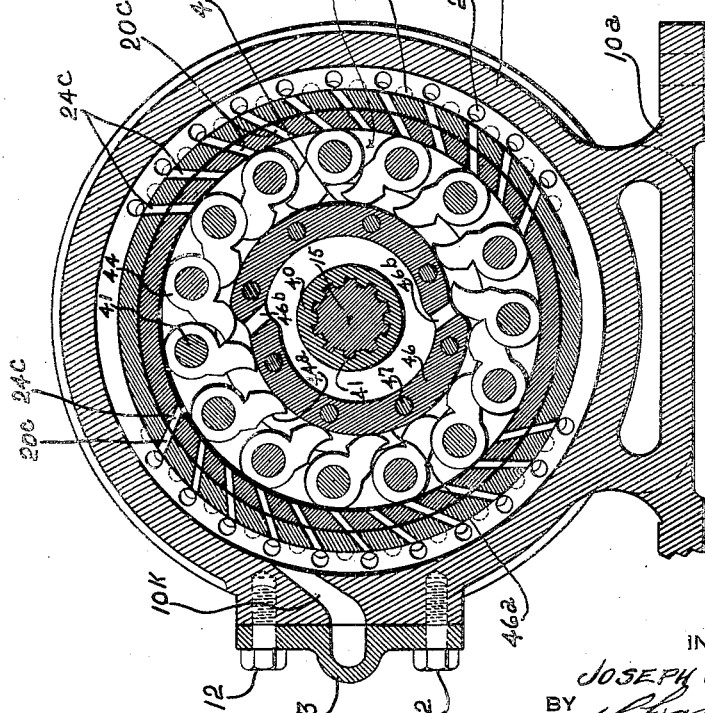
Fig. 2 is a vertical section taken substantially on line 2—2 of Fig. 1 as indicated by the arrows.

Within outer casing 10 is disposed an inner casing 20 having a cylindrical portion 20a and end portions 20b. Portion 20a seats in annular recesses formed in end portions 10d and 10e and is held in stationary position by dowel pins 21. The end portions 20b are of disk-like form and connected to portion 20a by the circumferentially spaced bolts 22 having heads countersunk in portion 20a. It will be seen that portions 20b abut the inner sides of end portions 10d and 10e. A sleeve 24 fits on and is rotatable on portion 20a, the outer side of said sleeve being spaced from portion 10c to form an annular chamber 25. Sleeve 24 has end flanges 24a which fit against end portions 10d and 10e respectively. Portion 20a has extending therethrough a series or multiplicity of passages 20c which are adapted to be brought into and out of register by rotation of sleeve 24 with passages 24c respectively. As shown in Figs. 2 and 3 passages 20c and 24c extend substantially tangentially of portions 20a and 24. The flanges 24a are also provided with a series of inclined circumferentially spaced passages 24b adapted to be brought into and out of register with passages 10j respectively by rotation of sleeve 24. Sleeve 24 has secured to its outer side in chamber 25 by the countersunk screws 26 a rack 27. A gear 28 meshes with rack 27 and is carried on a shaft 29 extending through a boss on portion 10c and having secured thereto a lever 30. Packing 31 is disposed in a recess about shaft 29 and held in place by a gland 32 fitting in a bore in said boss on portion 10c, the same being engaged by lever 30. The outer end of shaft 29 is threaded to receive a nut 33 engaging the top of lever 30. Lever 30 has one end disposed over a scale plate 34 having graduations 34a thereon and the end of lever 30 is provided with a mark 30a adapted to cooperate with graduations 34a. Plate 34 is secured to one end of portion 10c by countersunk screws 35. Lever 30 has a handle portion at one end and moves over an arcuate plate 37 secured to the end of portion 10c opposite that having plate 34 by the countersunk screws 38.

Shaft 15 has secured thereto the splined hub of a rotor 40. Said hub receives the keys or splines 41 on shaft 15. As shown in Fig. 1 said hub of rotor 40 extends between bearings 14. Rotor 40 has a central disk-like portion 40a extending transversely of inner casing portion 20a and disposed centrally between end portions 20b. The periphery of portion 40a is substantially in contact with the inner surface of portion 20a. Portion 40a has adjacent its periphery a series of circumferentially threaded bores 40b and studs 41 have threaded ends secured in said threaded bores. Said bores are preferably threaded for only a portion of their length and studs 41 have cylindrical portions fitting in the unthreaded parts of said bores. Studs 41 have collars 41a engaging the sides of portion 40a. It will be seen that studs 41 project at opposite directions from portion 40a and the studs at one side thereof are in circumferentially staggered relation to the studs at the other side thereof, said studs being equally spaced. The end portions 20b have annular recesses formed therein in which are disposed rings 42. Studs 41 have reduced portions extending into rings 42 and screws 43 having their heads countersunk in rings 42 extend into the ends of studs 41. Said studs 41 are thus securely held at each end. Oscillatably mounted on the studs 41 are vanes 44. As shown in Figs. 2 and 3, the hubs of vanes 44 move substantially in contact with the wall of inner casing 20. Vanes 44 have crescent shaped free ends, the outer sides of which have curved surfaces 44a having the same curvature as the periphery of the hubs of said vanes and thus fitting perfectly against said hubs. It will be seen that there are thus two series of vanes 44, one series being disposed at each side of central portion 40a of rotor 40. Within the vanes of each series is disposed a cam 46, the same being held in stationary position and secured to end members 20b by circumferentially spaced bolts 47 threaded into portions 20b and having heads countersunk in cams 46. As shown in Figs. 2 and 3 cams 46 have outer surfaces 46a which are curved and in eccentric relation to portion 20a and said cams have outlet openings 46b at opposite sides disposed between the inner and outer portions of the surfaces 46a. As shown in Figs. 2 and 3, the openings 20c and 24c are disposed in two groups, there being one group opposite each of the curved surfaces 46a.

In operation, conduit 13 will be connected to a suitable pump or other source of fluid under pressure. The motor is designed for the use of liquid such as oil. The fluid under pressure will enter chamber 25 through the passage 10k. When sleeve 24 is turned to bring passages 20c and 24c into register the fluid will pass through said aligned passages and said passages will form in effect nozzles directing the liquid under pressure against the vanes 44. This will cause rotation of said vanes and of rotor 40. The fluid passes between said vanes and out through the openings 46b. Vanes 44 change their position due to cams 46. A larger surface is thus progressively disposed to the fluid under pressure. It will be seen that as the vanes pass the outlet openings 46b the outer curved surface 44a is in engagement with the hub of the following vane so that a seal is provided. The hubs of the vanes as stated move substantially into engagement with the inner surfaces of the inner casing wall and there will be a film of oil on said wall so that there is very little if any friction. The outer surfaces or peripheries of cams 46 will be very smooth and these cams will be made of hardened metal so that there will be little friction of the vanes on the cams. A film of oil will also be present on said cams. When openings 20c and 24c are in register the openings 24b and 10j are out of register or partially out of register some of the fluid will then pass through openings 24b and 10j into the chambers 10f and 10g and to the outlet conduit 10i through passage 10h. When the liquid passes through outlets 46b in the cams 46 it passes longitudinally of said cams about hub of rotor 40 and through passages 20d into the chambers 10f and 10g and out through discharge conduit 10i. When passages 20c and 24c are entirely out of register all of the fluid is bypassed through passages 24b and 10j into the chambers 10f and 10g and out through discharge conduit 10i.

It will be seen that the rotor with its two series of vanes, the cams and the passages from the cams are all symmetrical about the central vertical plane of rotor 40. The pressure will thus be nicely balanced at each side of portion 40a and the rotor will be efficiently propelled. It will also be seen that the end portions 10d and 10e with their chambers 10f and 10g are symmetrical with the inner casing and rotor as well as with sleeve 24 about the central vertical plane of the rotor. There will thus be a nice balance of the liquid pressure in all parts of the turbine. The speed of the turbine can be varied by adjustment of sleeve 24 and a high speed or velocity of rotation of rotor 40 can be had with comparatively low fluid pressure. A pump having constant volume delivery can thus give any speed desired. The pressure of liquid can be increased to handle the load desired.

It will also be seen that the shaft 15 may be driven and the device could then be used as a pump. Shaft 15 would be driven in the direction opposite to which it is rotated as already described and the fluid or liquid would then enter conduit 10i and would be forced out through conduit 13.

From the above description it will be seen that I have provided a simple, compact and efficient fluid motor. The parts are so constructed that the assembly of the motor may be easily and quickly accomplished. The parts are simple in construction and can be easily made and quickly and efficiently machined. As stated, the parts are so arranged that a perfect liquid balance is secured which insures a high efficiency. It is apparent that the invention will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A fluid motor having in combination, an outer casing, an inner casing within said outer casing, a shaft journaled in said outer casing, a rotor secured to said shaft having a central portion extending transversely of said inner casing and two series of oscillating vanes carried by said portion, said series being disposed at each side of said portion respectively, said vanes revolving with said rotor in said inner casing, a sleeve fitting on and rotatable on said inner casing, said sleeve being spaced from the wall of said outer casing to form a chamber, said sleeve and inner casing having a series of circumferentially spaced passages therethrough at each side of said central portion adapted to be brought into and out of register by rotation of said sleeve, said passages acting as nozzles directed toward said vanes, a cam on which said vanes ride in the rotation of said rotor having outlet passages therethrough and means for supplying fluid under pressure to said chamber.

2. A fluid motor having in combination, an outer casing, an inner casing within said outer casing, a shaft journaled in said outer casing, a rotor secured to said shaft having a central portion and two series of oscillating vanes carried by said portion, said vanes being disposed at each side of said portion respectively, said vanes revolving with said rotor in said inner casing, a sleeve fitting on and rotatable on said inner casing, said sleeve being spaced from the wall of said outer casing to form a chamber, said sleeve and inner casing having a series of circumferentially spaced passages therethrough for each series of vanes, said passages being adapted to be brought into and out of register by the rotation of said sleeve, said passages forming nozzles and extending tangentially to the circumference of said inner casing and sleeve and directed toward said vanes, a cam on which said vanes ride in the rotation of said rotor having outlet openings therethrough and means for supplying fluid under pressure to said chamber.

3. The structure set forth in claim 2, said cam having outlet openings at opposite sides thereof and having curved surfaces engaged by said vanes, said surfaces being eccentric with said inner casing and respectively having their innermost and outermost portions at said openings, said series of passages in said inner casing and sleeve being circumferentially divided into two groups.

4. A fluid motor having in combination, an outer casing, an inner casing within said outer casing, a sleeve fitting and rotatable on said inner casing and spaced from said outer casing to form a chamber thereabout, a rotor within said inner casing having two series of circumferentially spaced oscillating vanes thereon, said series being disposed at each side of said rotor respectively, a cam for each series of vanes within said rotor on which said vanes ride in the rotation of said rotor, said cam having outlet openings therethrough, said outer casing having an outlet chamber at each end communicating respectively with the outlet openings of said cams, said inner casing and sleeve having a series of passages extending tangentially therethrough and adapted to be brought into and out of register by the rotation of said sleeve and passages in said sleeve and outer casing adapted to be brought into and out of register by rotation of said sleeve for connecting or disconnecting said chamber from said chambers in the end portions of said outer casing respectively.

5. A fluid motor having in combination, an outer casing, an inner casing, a shaft journaled in said outer casing, a rotor secured to said shaft disposed within said inner casing, said rotor having a central disk-like portion, studs secured in said portion and projecting at opposite sides thereof in circumferentially spaced relation, vanes journaled on said studs and having outer portions movable substantially in contact with the wall of said inner casing, stationary cams on which the free ends of said vanes ride in the rotation of said rotor, said cams having outlet openings extending therethrough and having outlet openings extending longitudinally thereof and each end of said outer casing having an outlet chamber communicating respectively with said latter outlet passages in said cam.

6. The structure set forth in claim 5, the studs at opposite sides of said rotor being staggered circumferentially.

7. A fluid motor having in combination, an outer casing, an inner casing within said outer casing, said outer casing having end portions, a shaft extending through and journaled in said end portions, said inner casing having end walls engaging said end portions and a cylindrical wall therebetween, a sleeve fitting and rotatable on said cylindrical wall, a rotor within said inner casing having a central disk-like portion fitting in said inner casing centrally between the end walls thereof, studs secured in said disk-like portion and projecting at opposite directions therefrom, vanes oscillatably mounted on said studs, rings seated in the end walls of said inner casing and screws passing through said rings into each of said studs, a cam secured in said inner casing at each side of said disk-like portion of said rotor on which the vanes on each side of said disk-like portion ride, said cams having outlet openings therethrough, said end walls having openings aligned with said latter openings, said end portion of said outer casing having outlet chambers communicating with said latter openings, said inner casing and sleeve having a series of openings adapted to be brought into and out of register by rotation of said sleeve and disposed at each side of said disk-like portion of said rotor, said passages acting as nozzles and means for supplying fluid under pressure to said first mentioned chamber.

8. A fluid motor having in combination, an outer casing, an inner casing having a cylindrical wall and end walls, said end walls fitting between the end portions of said outer casing, a sleeve fitting and rotatable on said cylindrical wall of said inner casing and having end flanges, said sleeve and end flanges forming an annular chamber within said outer casing, a shaft journaled in said casing, a rotor secured to said shaft and disposed within said inner casing, said rotor having a series of oscillating vanes at each side thereof symmetrically disposed with relation to the central vertical plane of said rotor, a cam for each of said series of vanes on which said vanes ride in the rotation of said rotor, said cams and end walls of said inner casing having aligning discharge passages, said cylindrical portion of said inner casing and said sleeve having a series of circumferentially spaced passages extending therethrough for each series of said vanes and adapted to be brought into and out of register in the rotation of said sleeve, said outer casing having passages in the end portions thereof and said sleeve having circumferentially spaced passages in said end flanges thereof, said latter passages in said sleeve being adapted to be brought into and out of register in the rotation of said sleeve, said annular chamber being adapted to receive fluid under pressure.

9. A fluid motor having in combination, an outer casing, an inner casing within said outer casing, a shaft journaled in said outer casing, a rotor secured to said shaft having a central portion extending transversely of said inner casing and two series of oscillating vanes carried by said portion, said series being disposed at each side of said portion respectively, said vanes revolving with said rotor in said inner casing, members on which said series of vanes respectively rotate, said members having discharge passages therethrough, means for supplying fluid under pressure to each series of vanes for rotating said rotor and discharge passages for said fluid leading from said members.

10. A fluid motor having in combination, an outer casing having end walls, an inner casing within said outer casing, a shaft journaled in said end walls of said outer casing and extending longitudinally through both of said casings, a rotor secured to said shaft having a central portion extending transversely of said inner casing and two series of oscillating vanes carried by said portion, said series being disposed at each side of said portion respectively, said vanes revolving with said rotor in said inner casing, cams on which said series of vanes respectively rotate disposed between said vanes and said shaft, and a series of nozzles for directing liquid under pressure into said inner casing against each series of vanes for rotating said rotor and means for discharging liquid from said vanes and cams at each end of said outer casing respectively.

11. A fluid motor having in combination, an outer casing, an inner casing within said outer casing, a shaft journaled in said outer casing, a rotor secured to said shaft having a central portion extending transversely of said inner casing and two series of oscillating vanes carried by said portion, said series being disposed at each side of said portion respectively, said vanes revolving with said rotor in said inner casing, means engaged by each series of vanes in the rotation thereof having discharge passages, a series of circumferentially spaced nozzles for directing fluid under pressure against each series of vanes to rotate said rotor and means extending in opposite directions receiving said liquid from said discharge passages whereby the liquid pressure is balanced in said turbine.

12. A fluid motor having in combination, an outer casing, an inner casing within said outer casing, a shaft journaled in said outer casing, a rotor secured to said shaft having a central portion extending transversely of said inner casing and two series of oscillating vanes carried by said portion, said series being disposed at each side of said portion respectively, said vanes revolving with said rotor in said inner casing, means on which each series of vanes rides in its rotation arranged to change the position of said vanes, a series of circumferentially spaced nozzles at each side of said inner casing for directing liquid under pressure against each series of vanes and discharge passages for said liquid leading in opposite directions whereby the liquid pressure is balanced in said turbine.

13. A fluid motor having in combination, an outer casing having end walls, an inner casing within said outer casing, a shaft journaled in said end walls and extending therebetween, a rotor secured to said shaft disposed within said inner casing and having two series of oscillatable vanes thereon disposed respectively at each side of the center thereof longitudinally of said shaft, stationary hollow cam members extending about said shaft, one for each of said series of vanes on which the vanes bear in their rotation, said cam members having exhaust openings through which the fluid passes to the inner side of said cams and having end openings at the remote ends of said inner casing through which the fluid from said series of vanes respectively passes, said inner casing having openings in its periphery through which said fluid is directed to said vanes, said motor thus having a fluid balance longitudinally of said shaft.

14. A fluid motor having in combination, an outer casing, an inner casing within said outer casing having a cylindrical inner wall, a shaft journaled in said outer casing and extending therethrough, a rotor secured to said shaft having a disk-like central portion extending transversely of said inner casing and to said inner wall thereof, thus dividing said inner casing and two series of oscillating vanes carried by said portion, one at each side thereof, said vanes revolving with said rotor in said inner casing, members on which said series of vanes respectively rotate, said members having discharge passages therethrough and having discharge passages at the remote ends of said inner casing, and means for supplying fluid under pressure to each series of vanes for rotating said rotor whereby a fluid balance is maintained longitudinally of said shaft.

JOSEPH O. HAMREN.